Sept. 23, 1969   R. L. GOWAN   3,469,186
STIMULUS INJECTION SYSTEM FOR LOCALIZING DEFECTIVE
COMPONENTS IN CASCADED SYSTEMS
Filed March 14, 1967
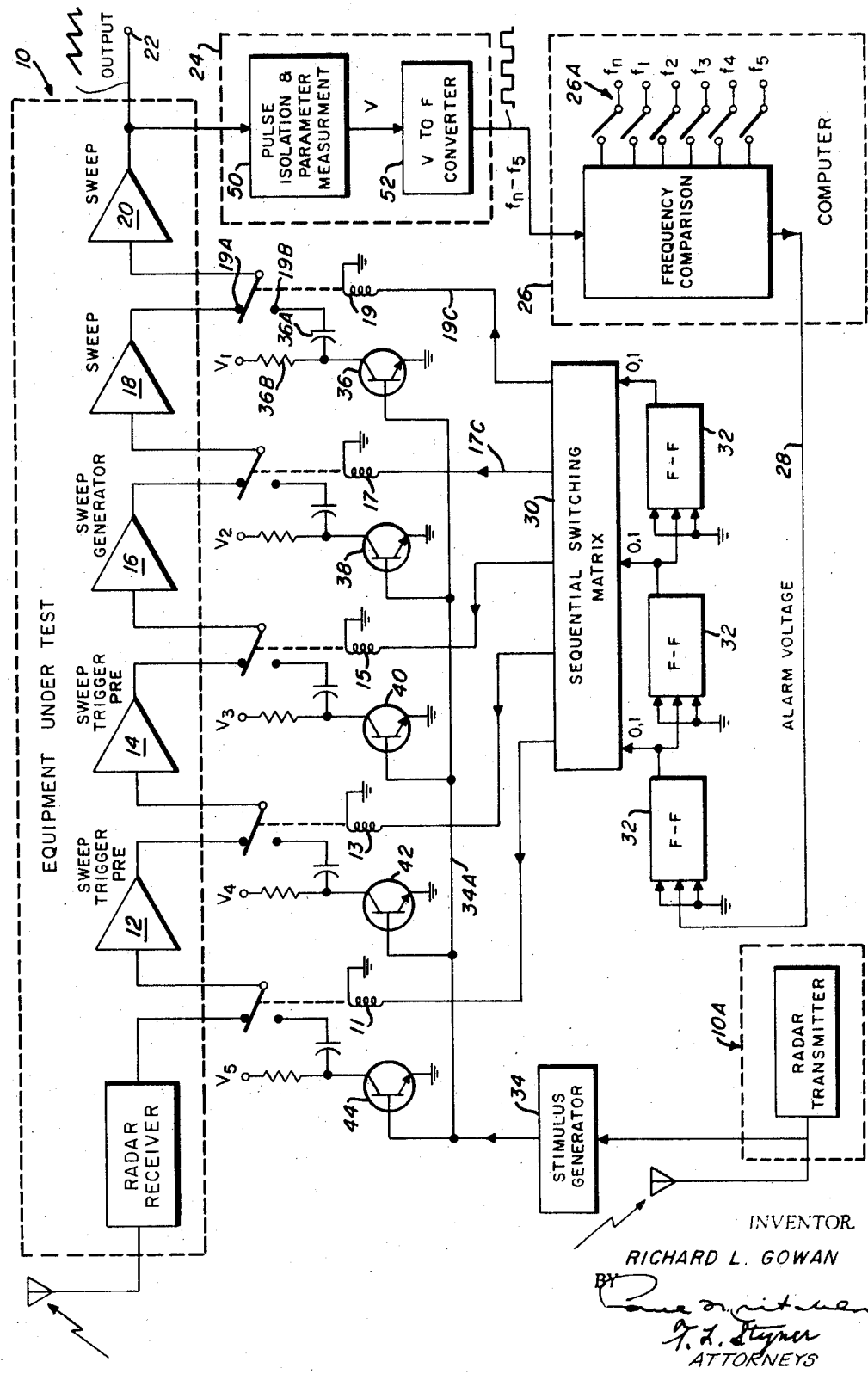
INVENTOR.
RICHARD L. GOWAN
BY
ATTORNEYS

United States Patent Office 3,469,186
Patented Sept. 23, 1969

3,469,186
STIMULUS INJECTION SYSTEM FOR LOCALIZING DEFECTIVE COMPONENTS IN CASCADED SYSTEMS
Richard L. Gowan, Coronado, Calif., assignor to the United States of America as represented by the Secretary of the Navy
Filed Mar. 14, 1967, Ser. No. 623,524
Int. Cl. G01r 15/12
U.S. Cl. 324—73                             5 Claims

ABSTRACT OF THE DISCLOSURE

To localize a defective component in a series of cascaded components the output of the series is continuously monitored and an alarm voltage is produced each time an out-of-limits signal arrives. In response to an alarm, a standardized stimulus signal locally generated, is injected into the input of the last component of the series. If the last component in the series thus stimulated is operating properly, the remaining components are successively stimulated until the faulty component is found.

STATEMENT OF GOVERNMENT INTEREST

The invention described herein may be manufactured and used by or for the Government of the United States of America for governmental purposes without payment of any royalties thereon or therefor.

BACKGROUND

This invention relates to improvements in test equipment for locating faulty components in complex electronic gear.

By component is meant sub-assemblies or modules such as amplifiers or oscillators, logical computer units, dividers and multipliers. More specifically the component considered here is the circuitry which may be placed in a plug-in unit or on a printed circuit card. If a faulty unit is replaceable and can be quickly identified, the downtime of the equipment can be minimized.

The object of this invention is to provide means for identifying the defective component from a series of cascaded or functionally related components.

The test system of this invention for locating a fault in a complex electrical equipment having a series of cascaded components comprises a plurality of test terminals connected to the input and output circuits of each of the components of the series. An output signal monitor is connected to the output of the final component of the series to perform a summary test of the system. The parameter to be measured such as amplitude, pulse width or rise time, of the output signal is compared to a standard and when the parameter lies outside predetermined limits an alarm voltage is generated. The alarm voltage initiates a stimulus generator and sequential switch means responsive to the alarm voltage connects the generator successively to the input circuits of each component for identifying the faulty component.

Other objects and features of this invention will become apparent to those skilled in the art by referring to the following specifications in connection with the accompanying drawing in which the single figure shows a block diagram of the preferred embodiment.

In the interest of this disclosure a specific equipment to be tested is illustrated by way of example in the drawing. At 10, for example, is shown the sweep circuits of a radar system. For a reliable and accurate sweep voltage at the output terminal 22 there must be faithful operation of the components 12, 14, 16, 18, 20 cascaded ahead of the output terminal. Following the synchronizing source in the receiver are the sweep trigger amplifiers 12 and 14, the sweep generator 16, and the sweep amplifiers 18 and 20. The transmitting portion of the radar system is shown at 10A.

According to this invention the input circuit of each component 12–20 is brought out to the armature of a single pole double throw switch as shown. The switch contacts are normally closed to provide normal passage of signal from the output of one component into the input circuit of the next. Further, during normal operation, the output signal at terminal 22 is continuously or periodically monitored. The output signal monitor shown at 24 and 26 compares the desired parameter of the output signal with locally stored standards to determine if the signal parameter is within limits. If the signal is outside of limits an alarm voltage is produced on line 28. The first alarm voltage to the flip-flop counter register 32 and sequential matrix 30 energizes winding 19 of the relay to disconnect the coupling between components 18 and 20 and to instead, connect the input of the amplifier 20 to the output of the stimulus generator 34. As is known, square wave testing is a powerful method of circuit performance analysis; accordingly, the output of 34 is preferably a square wave. Now, the input to the last component 20 may be traced through the armature of switch 19, contact 19B, and coupling condenser 36A to the collector-end of load resistor 36B. The emitter-collector current of transistor amplifier 36 is controlled by the base electrode which is connected to the bus bar 34A and hence to the output of the stimulus generator 34.

If a second alarm voltage is received on line 28, the first relay 19 is deenergized and the second relay 17 is energized and the input of component 18 is coupled through amplifier 38 to the stimulus generator. Likewise a third, a fourth and a fifth alarm voltage will successfully energize relays 15, 13, and 11, and components 16, 14, and 12 are successively exercised through amplifiers 40, 42, and 44.

Although the signal to be tested may be of any form, the signals of the equipment illustrated are pulses. Accordingly, the output at 22 may be monitored for such parameters as pulse width, pulse height, pulse rise time, or frequency. Where pulse width, say, is to be measured a single pulse preferably is isolated in the equipment of assembly 50 and the width of the isolated pulse is measured in terms of an analog voltage. In the monitoring system contemplated here it is preferred that this analog voltage be converted in converter 52 to a pulse train the frequency of which is a linear function of the analog voltage and hence of the parameter to be measured. This frequency for normal operation of the equipment under test will be termed $f_n$. Conveniently, a series of pulses is acceptable to the general purpose computer 26. One system for sensing a signal parameter, deriving an analog voltage, and generating an analogous frequency is described in greater detail in the copending application Ser. No. 494,990, filed Oct. 11, 1965 and entitled "Data Gathering System." Logic circuitry, not shown in the computer, is adapted to compare the incoming frequency with a local standard to determine whether the incoming frequency is within prescribed limits. In addition to the normal $f_n$ from the local generator, frequencies $f_1$, $f_2$, $f_3$, $f_4$ and $f_5$ may be provided for comparison with the monitored parameter when the stimulus generator output is injected, respectively, into the five components 20, 18, 16, 14 and 12, and when the injected signal may differ in some respect from the normal signal.

OPERATION

The direct current voltage, $V_1$ from the sensor 50 is fed into converter 52 to convert the analog voltage to a frequency proportional to the pulse parameter to be measured. Where a number of equipments must be monitored, the several outputs may be successively switched to or multiplexed with the sensor 50. When the computer detects $f_n$ is not normal, an alarm voltage appears on line 28 and the flip-flops 32 are stepped up one digit. The sequential switching matrix places a logical "1" voltage on line 19C which energizes relay winding 19 and shifts the input to amplifier 20 from contact 19A to contact 19B. The remaining output lines of the matrix remain at a logical "0" voltage. Square pulses appearing on bus 34A from generator 34 are applied to the base of amplifier 36 and hence across coupling resistor 36B and condenser 36A to the input of amplifier 20. Voltage $V_1$ connected through resistance 36B to the collector is adjusted to a value which will assure that the amplitude of the injected stimulus pulses are comparable in amplitude to the pulses normally received from the preceding component 18. The sensor 50 samples at output 22 the injected stimulus pulses and the V to F converter 52 outputs a frequency which is a function of the width, in the assumed example, of the output pulse. Since the width of the injected pulse from generator 34 may or may not be the same as the normal equipment pulse width, the converter output frequency may be $f_1$ instead of $f_n$. Frequency $f_1$ will lie within certain limits if component 20 is operating correctly. If $f_1$ lies in its normal range the computer knows that block or amplifier 20 is operating correctly and the computer is programmed to generate a second alarm voltage on line 28. This second voltage into counter register 32 steps the binary content of the register to a second binary value and the switching matrix energizes line 17C and coil 17 to shift the stimulus generator from amplifier 20 to amplifier 18. Again, voltage $V_2$ applied to the collector of amplifier 38 is adjusted to a predetermined value, preferably to a value to make the amplitude of the stimulus pulse equal to the amplitude of the normal signal at this point. That is, in this mode the normal signal path through the analog equipment under test is interrupted by 17 and the stimulus generator injects the signal to amplifier 18. If amplifier 18 is normal (amplifier 20 has been adjudged normal), a certain frequency $f_2$ at converter 52 will be the result of operating the stimulus generator in this second mode. By similar processes, the stimulus generator can be switched into the inputs of components 16, 14 and 12. If during any of these five injections the correct frequency is not sensed at 50 in response to the particular mode of stimulus generator operation, it can be concluded that the component into which the stimulus is being fed is the defective component. If in fact different frequencies result in response to the injection to different components, the computer must be provided with the various frequencies ($f_1$–$f_5$), as shown at 26A in the computer with suitable switch means for applying the appropriate frequency to the comparing means. The computer under automatic program control could print out the number and location of the defective block.

With this fault location information, unskilled operators can replace the defective component, block or plug-in unit and quickly restore the entire equipment to useful operation. With multiplexing techniques all of the equipments of, say, a ship can be continuously monitored and the defective components quickly replaced, and the down time of complex gear can be reduced.

What is claimed is:

1. In a test system for locating a fault in complex electrical equipment having a series of cascaded components for successively processing an informational signal, said system comprising;
   summary test means coupled to the output terminal of said equipment for comparing a parameter of the final output signal with predetermined standards and for generating alarm voltages when the output signal is abnormal,
   a stimulus generator for locally generating signals similar to said informational signal,
   sequential switch means responsive to said alarm voltages for connecting said generator successively to the input circuits of said components and disconnecting said input circuits from the signal output of the preceding component of said series of components, for identifying a faulty component.

2. In the test system defined in claim 1, said summary test means comprising;
   means for sensing a predetermined parameter of the signal under test,
   means for generating a voltage analagous in amplitude to the magnitude of said parameter,
   a voltage-to-frequency converter responsive to said voltage generating means for generating a frequency which is a function of the magnitude of the parameter under test, and
   frequency comparing means for comparing the generated converter frequency with predetermined upper and lower frequency standards and for generating said alarm voltage when the converter frequency is outside said standards.

3. In the test system defined in claim 1, said sequential switch means comprising;
   a shift register with a plurality of cascaded flip-flops responsive to a succession of said alarm voltages for generating a binary coded number,
   a sequential switching matrix responsive to said binary number for generating a logical one voltage successively on each of a plurality of output lines, and
   a plurality of relays responsive, respectively, to the logical one voltages on said output lines for successively connecting said stimulus generator to the inputs of said equipment components.

4. In the test system defined in claim 1;
   the coupling between the stimulus generator and the inputs to said components comprising respectively an amplifier between each component input circuit and the output of said stimulus generator, and
   means for adjusting the amplitude of the output voltage of each amplifier to a value commensurate with the normal input signal voltage of the associated component.

5. The test system defined in claim 1 further comprising;
   a plurality of relays connected, respectively, to the input of each component for selectively connecting the input of the associated component to either the output of the next adjacent component or to said stimulus generator.

References Cited

UNITED STATES PATENTS 2,925,591   2/1960   Burkhart.

RUDOLPH V. ROLINEC, Primary Examiner

E. L. STOLARUN, Assistant Examiner

U.S. Cl. X.R.

324—51, 57